(12) United States Patent
Yukitomo

(10) Patent No.: US 12,063,917 B2
(45) Date of Patent: Aug. 20, 2024

(54) FISHING LURE WITH PIVOTING ARM

(71) Applicant: Hikaru Yukitomo, Otsu (JP)

(72) Inventor: Hikaru Yukitomo, Otsu (JP)

( * ) Notice: Subject to any disclaimer, the term of this patent is extended or adjusted under 35 U.S.C. 154(b) by 0 days.

(21) Appl. No.: 17/834,528

(22) Filed: Jun. 7, 2022

(65) Prior Publication Data
US 2022/0394963 A1    Dec. 15, 2022

(30) Foreign Application Priority Data

Jun. 14, 2021  (JP) .................................. 2021-099021

(51) Int. Cl.
*A01K 85/00*  (2006.01)
*A01K 85/16*  (2006.01)

(52) U.S. Cl.
CPC .......... *A01K 85/1867* (2022.02); *A01K 85/16* (2013.01)

(58) Field of Classification Search
CPC .... A01K 85/1867; A01K 85/16; A01K 85/10; A01K 85/14; A01K 85/18; A01K 85/1833; A01K 85/1837; A01K 85/1861; A01K 85/1871; A01K 85/1877; A01K 85/1881; A01K 85/1883; A01K 85/1887; A01K 85/1891; A01K 85/1807; A01K 85/00
USPC ..... 42/42, 42.03, 42.04, 42.13, 42.11, 42.15, 42/42.16, 42.17, 42.18, 42.19, 42.2, 42/42.21, 42.39, 42.49, 42.5
See application file for complete search history.

(56) References Cited

U.S. PATENT DOCUMENTS

| | | | | |
|---|---|---|---|---|
| 3,808,726 A * | 5/1974 | Flanagan, Jr. | ......... | A01K 85/00 43/42.13 |
| 4,045,903 A * | 9/1977 | Parker | ..................... | A01K 85/00 43/42.31 |
| 4,773,180 A * | 9/1988 | Shimizu | .................. | A01K 85/00 43/42.11 |
| 4,777,761 A * | 10/1988 | Renaud | .................. | A01K 85/16 43/42.47 |
| 5,337,508 A * | 8/1994 | Pfeiffer | .................. | A01K 85/16 43/42.22 |
| 5,649,384 A * | 7/1997 | Manning | ................ | A01K 85/00 43/42.39 |
| 6,041,539 A * | 3/2000 | Huang | .................... | A01K 85/16 43/42.22 |
| 8,099,899 B2 * | 1/2012 | Scott | ...................... | A01K 85/18 43/42.47 |
| 8,857,099 B1 * | 10/2014 | Hamrick, Jr. | .......... | A01K 85/00 43/42.11 |
| 8,991,095 B2 * | 3/2015 | Roberts | .................. | A01K 85/00 43/44.8 |
| 11,160,261 B1 * | 11/2021 | Dickerson | .............. | A01K 83/00 |
| 11,206,819 B1 * | 12/2021 | Rye | ........................ | A01K 95/00 |

(Continued)

FOREIGN PATENT DOCUMENTS

JP          3529457 B2      5/2004

*Primary Examiner* — Timothy D Collins
*Assistant Examiner* — Maria E Graber
(74) *Attorney, Agent, or Firm* — Hauptman Ham, LLP

(57) ABSTRACT

A fishing lure comprises a head; a hook connected to the head; an arm rotatably connected to the head with the lateral direction of the head as a rotation axis, the rotation axis located inside the head; and a blade connected to the arm. The rotation locus formed when the arm is rotated may be included in a plane with the lateral direction of the head as perpendicular line. The arm may be restricted from moving in the lateral direction of the head.

10 Claims, 6 Drawing Sheets

(56) References Cited

U.S. PATENT DOCUMENTS

| | | | | |
|---|---|---|---|---|
| 2004/0154212 A1* | 8/2004 | Harrell | A01K 85/00 | 43/42.39 |
| 2005/0166444 A1* | 8/2005 | Taylor | A01K 85/14 | 43/42.13 |
| 2007/0028505 A1* | 2/2007 | Van Wyk | A01K 85/16 | 43/42.32 |
| 2010/0229453 A1* | 9/2010 | Cunningham | A01K 85/01 | 43/42.31 |
| 2010/0263258 A1* | 10/2010 | Hinz | A01K 85/12 | 43/42.13 |
| 2011/0308135 A1* | 12/2011 | Uhrig | A01K 85/00 | 43/42.19 |
| 2012/0204472 A1* | 8/2012 | Roberts | A01K 85/00 | 43/42.39 |
| 2013/0247444 A1* | 9/2013 | Young | A01K 85/00 | 43/42.39 |
| 2014/0237889 A1* | 8/2014 | Tamburro | A01K 85/00 | 43/42.09 |
| 2022/0046906 A1* | 2/2022 | Moorhead | A01K 85/1817 | |
| 2022/0295768 A1* | 9/2022 | Embry | A01K 85/10 | |

* cited by examiner

FISHING LURE WITH PIVOTING ARM

CROSS REFERENCE TO RELATED APPLICATIONS

This application claims the benefit of priority to Japanese Patent Application No. 2021-099021, filed on Jun. 14, 2021, the entire contents of which are incorporated herein by reference.

FIELD

The present invention relates to a lure used for lure fishing. In particular, it relates to a wire bait type lure.

BACKGROUND

Conventionally, a type of lure called a wire bait has been known as a lure used for lure fishing. A basic skeleton of wire bait is formed of a wire (metal wire), and spinner bait has long been known as a typical wire bait. The spinner bait has a structure in which a head functioning as a weight is fixed to one end of a substantially L-shaped wire together with a hook, and a blade functioning as a rotative member is connected to the other end of the wire (for example, Japanese Patent No. 3529457).

SUMMARY

Lure in an embodiment of the present invention includes a head, a hook attached to the head, with respect to the head, an arm which is rotatably connected to the lateral direction of the head as a rotation axis, and a blade connected to the arm, the rotation axis is disposed inside the head. The arm may include an upper arm and a lower arm. In that case, the upper arm is connected to the blade and the lower arm is connected to the head.

DESCRIPTION OF EMBODIMENTS

Figure 1A:
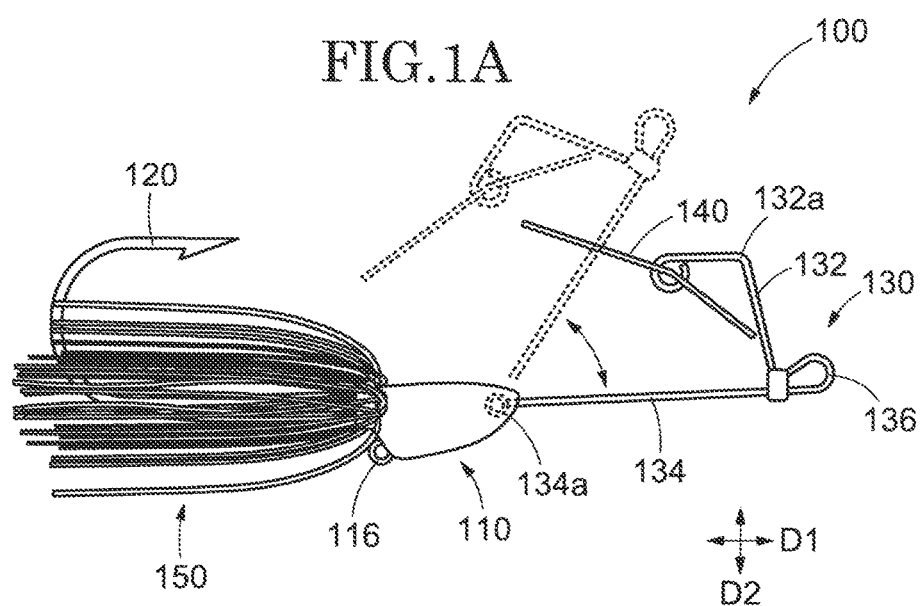
FIG. 1A is a diagram showing a configuration of a lure in a first embodiment.

In conventional wire baits, since the wire and the head is fixed, the head and the wire moves integrally with changes in attitude. Therefore, a change in the attitude of the wire bait causes a change in the positional relationship between the head which is the center of gravity and the blade, and in some cases, a desirable action (swimming) may not occur. The attitude of the wire bait varies depending on various factors. For example, increasing the retrieve speed (speed at which the lure is pulled) increases the resistance caused by the water flow received by the blade, the attitude changes in the direction in which the head faces upward (i.e., the direction in which the blade retracts). Also, if the wire bait is pulled in a deep range of water depth, it will be pulled upward by the line, the attitude also changes in a direction in which the head faces upward.

As described above, since the head and the wire are fixed, the conventional wire bait has a problem that the wire bait is easily affected by a change in attitude. Therefore, it was difficult to use stably the conventional wire bait in a deep range regardless of the retrieve speed.

One of the objects of the present invention is to provide a lure which can be used stably in a deep range regardless of the retrieve speed.

Hereinafter, a lure according to an embodiment of the present invention will be described with reference to the drawings. However, the lure of the present invention can be implemented in many different ways and should not be construed as being limited to the description of the following examples.

In addition, in this specification, "upper" refers to a direction in which buoyancy acts when the lure is used, and "lower" refers to a direction opposite to "upper" (i.e., a direction in which gravity acts). That is, when the lure is used in water, the direction in which the water surface is located is "upper", and the direction in which the lake bottom or the river bottom are located is "lower". In addition, "front" and "rear" refer to the direction in which the lure is pulled as "front" and the opposite direction as "rear". In addition, "left" and "right" refer to the left and right sides in the "front" facing condition. In the drawings referred to in the following description, the first direction (D1 direction) is a front-back direction, the second direction perpendicular to the first direction (D2 direction) is a vertical direction, the third direction perpendicular to the first direction and the second direction (D3 direction) is a lateral direction.

First Embodiment

Figure 1B:
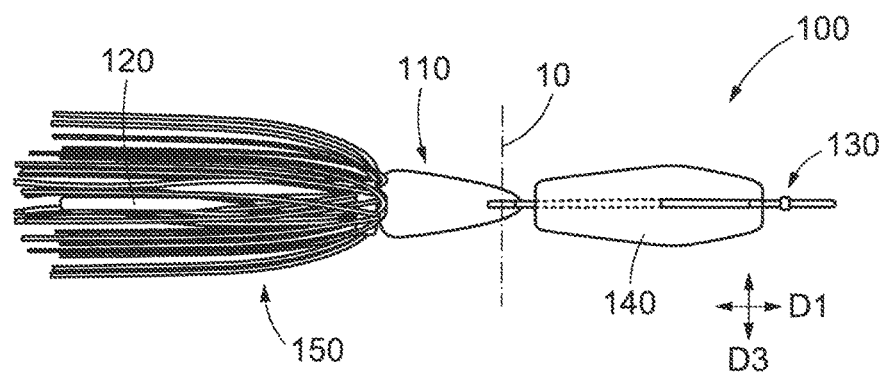
FIG. 1B is a diagram showing a configuration of the lure in the first embodiment.
Figure 1C:
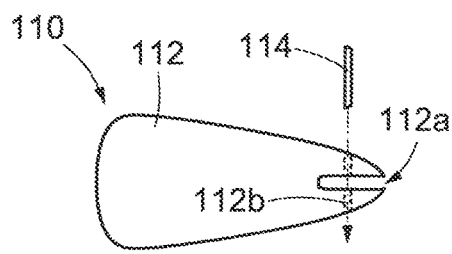
FIG. 1C is a diagram showing a configuration of the lure in the first embodiment.
Figure 1D:
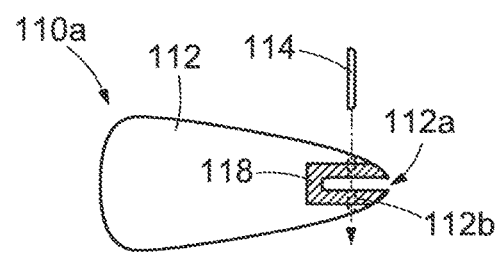
FIG. 1D is a diagram showing a configuration of the lure in the first embodiment.

FIG. 1A to FIG. 1D are diagrams showing the configuration of the lure 100 in the first embodiment. Specifically, FIG. 1A shows a right side view of the lure 100, and FIG. 1B shows a top view of the lure 100. FIG. 1C and FIG. 1D are enlarged views of the head 110 in the lure 100. As shown in FIG. 1A and FIG. 1B, lure 100 includes a head 110, a hook 120, an arm 130, a blade 140 and a rubber skirt 150. Lure 100 is a type of lure called a wire bait. Lure 100 of the present embodiment is similar to spinner bait, but differs strictly from spinner bait in that blade 140 does not rotate.

The head 110 functions as a weight. The Head 110 is formed of a metal member, and in the present embodiment, lead is used. However, as the metal member, other metal members such as tungsten and bismuth may be used instead of lead. Although there is no particular limitation on the shape of the head 110, usually has a narrower shape forward than the rear so as to let water pass through. Although not shown, the head 110 of the present embodiment, when viewed from the front, has an outer shape of the inverted triangle or inverted trapezoid. The Head 110 of the present embodiment, a ring shape member 116 is provided on the rear. The ring shape member 116 is an eye for mounting additional parts (e.g., hooks, sinkers, blades, etc.), but may be omitted.

The hook 120 is a so-called fishing hook. In the present embodiment, the hook 120 is fixed to the rear of the head 110. In the present embodiment, the head 110 is fixed to the shank part of the hook 120, so that the head 110 and the hook 120 are integrated with each other. However, the present invention is not limited to this example, the hook 120 may be movably mounted to the head 110.

The arm 130 is constituted by a wire (metal wire). The arm connects the head 110 and the blade 140. The arm also functions as a connecting member for connecting the lure 100 and a line. The Arm 130 includes an upper arm 132 located on the upper side and a lower arm 134 located on the lower side. Between the upper arm 132 and the lower arm 134, a line eye 136 constructed by bending the wire is provided. The line is tied to the line eye 136. The line eye 136 is soldered at the base so that the line eye 136 do not expand even if the size of the blade 140 is increased.

As shown in FIG. 1A, the blade 140 is connected to the upper arm 132. The upper arm 132 has a bend part 132a between the line eye 136 and the blade 140. The upper arm 132 extends generally upwardly from the line eye 136 to the bend part 132a and generally rearwardly from the bend part 132a to the blade 140. By making the upper arm 132 such a structure, when using the lure 100, it is possible to prevent problems such as scratches by blade 140 hitting the line.

The head 110 is connected to the lower arm 134. The lower arm 134 is rotatably connected to the head 110 about a rotation axis 10 extending in the lateral direction D3 of the head 110. The connecting structure between the head 110 and the lower arm 134 will be described later.

The blade 140 is composed of a thin plate-shaped member and is coupled to the upper arm 132. In the present embodiment, the blade 140 is formed of a plate-shaped metal member, but the present invention is not limited to this example, and may be formed of a plastic material. The blade 140 of the present embodiment, without rotating, is a swing member that swings by receiving a water flow.

Figure 2A:
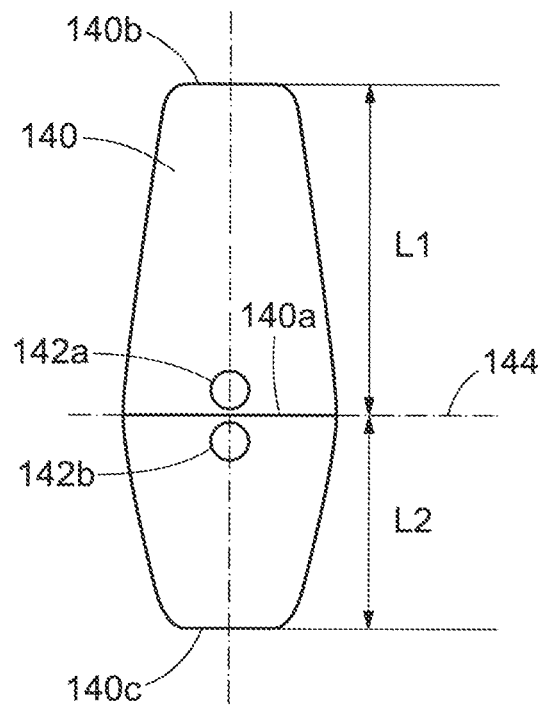
FIG. 2A is a diagram showing a configuration of a blade of the lure in the first embodiment.
Figure 2B:
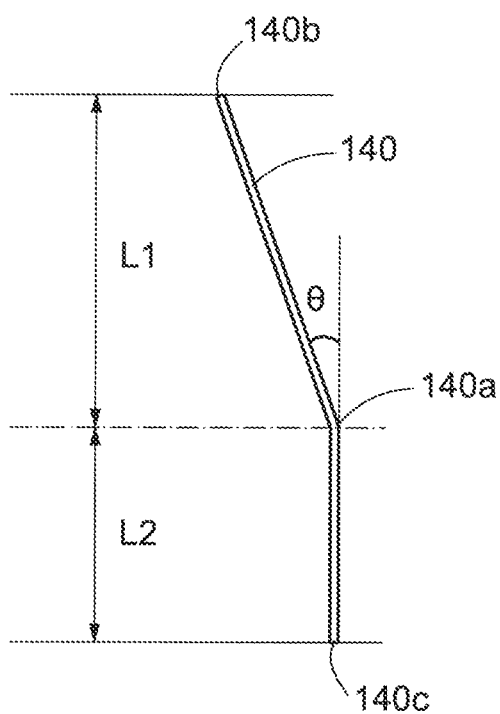
FIG. 2B is a diagram showing a configuration of the blade of the lure in the first embodiment.

FIG. 2A and FIG. 2B are diagrams showing a configuration of the blade 140 of the lure 100 in the first embodiment. Specifically, FIG. 2A is a front view showing the configuration of the blade 140 included in the lure 100. FIG. 2B is a side view showing the configuration of the blade 140.

As shown in the FIG. 2A, the blade 140 of the present embodiment has two through holes 142a and 142b. As shown in the FIG. 1A, in the present embodiment, the edge of the upper arm 132 is bent and inserted into the through holes 142a and 142b. That is, the two through holes 142a and 142b function as a connecting part for connecting the upper arm 132 and the blade 140. However, this connecting method is an example, and is not limited to this. For example, a component (e.g., a member such as a hook hanger) capable of inserting the upper arm 132 may be attached to the blade 140.

As shown in the FIG. 2B, the blade 140 of the present embodiment has a bend part 140a. Specifically, in the FIG. 2A, the blade 140 is bent so as to form a bend line 144 extending widthwise between two through holes 142a and 142b (in other words, through the connecting part with the upper arm 132). The angle (θ) of the bend in the bend part 140a may preferably be adjusted within a range of 5 to 30 degrees, but the present invention is not limited thereto. The upper arm 132 is coupled to the blade 140 via the connecting part located at the bend part 140a of the blade 140. The blade 140 of the present embodiment has the bend part 140a, so that the blade 140 can easily grasp the water when the lure 100 starts to move, and the response of the initial operation of the lure 100 improves.

As shown in FIG. 2A and FIG. 2B, the length (L1) from the bend line 144 to an upper edge 140b of the blade 140 is longer than the length (L2) from the bend line 144 to a lower edge 140c of the blade 140. That is, the position of the connecting part connecting the upper arm 132 and the blade 140 (that is, the position of the through holes 142a and 142b) is asymmetric with respect to the vertical direction. In this case, when the lure 100 is in use, the upper portion of the blade 140 (the portion having a length L1) undergoes more water flow than the lower portion (the portion having a length L2) and serves like a lip in the plug lure. Therefore, when the lure 100 is pulled in water, the blade 140 serves as a resistor (so-called lip) for receiving the water flow diagonally upward, thereby acting in a direction to dive the lure 100. That is, the blade 140 has a function of suppressing the upward lifting of the lure 100.

The rubber skirt 150 is obtained by bundling a plurality of linear members having elasticity, and is disposed behind the head 110. In the present embodiment, rubbers made of a silicon material are used as the rubber skirt 150, but the present invention is not limited thereto. The rubber skirt 150 functions as an attracting member for attracting fish, and also has the effect of diluting the presence of the hook 120. However, in the lure 100 of the present embodiment, the rubber skirt 150 is not an indispensable configuration, and may be omitted.

<Connecting Structure of the Head and the Arm>

As described above, in the lure 100 of the present embodiment, the arm 130 is rotatably connected to the head 110 with the lateral direction of the head 110 (D3 direction) as the rotation axis. That is, as shown in FIG. 1A, in a side view, the entire arm 130 rotates clockwise or counterclockwise with the lower arm 134 as a radial direction. In other words, the rotation locus formed when the arm 130 is rotated can be said to be included in the plane perpendicular to the lateral direction of the head 110 (D3 direction). There is a structural limitation on the extent to which arm 130 can rotate. Therefore, it can be said that the arm 130 is pivoting arm with respect to the head 110.

As shown in FIG. 1C, the head 110 of the present embodiment includes a head body 112 and a pin member 114. At the front edge of the head body 112, a notch 112a is provided for arranging a ring shaped member 134a (see the FIG. 1A) provided at the end of the lower arm 134. A through hole 112b extending in the lateral direction D3 is provided on the side surface of the head body 112 so as to cross the notch 112a. Diameter of the through hole 112b may be any size that can insert the pin member 114.

As shown in FIG. 1D, a protective member 118 composed of a material having a higher strength than the head body 112 may be provided to the front edge of the head body 112, and the notch 112a may be provided in the protective member 118. In the present embodiment, since lead is used as the material of the head body 112, there is a possibility that the notch 112a spreads due to gradual wear due to contact with the lower arm 134. In the construction shown in FIG. 1D, by using a higher strength metallic material such as tungsten or bismuth as the protective member 118, it is possible to suppress wear due to contact with the lower arm 134. However, the protective member 118 may be replaced with a wider range of the head body 112. In the FIG. 1D, the U-shaped protective member 118 is illustrated, but instead of this, the notch 112a may be formed by arranging two plate-shape protective members 118 apart from each other.

The ring shape member 134a provided at the edge of the lower arm 134 is disposed inside the notch 112a of the head body 112. The pin member 114 is inserted into the through hole 112b in a state in which the ring shape part 134a is disposed inside the notch 112a. At this time, the pin member 114 is also inserted into the ring shape part 134a. Thus, the arm 130 is rotatably connected to the head 110 with the pin member 114 extending in the lateral direction as a rotation axis. The pin member 114 may be fixed to the head 110 by an adhesive or the like.

In the case of the structure of the present embodiment, the arm 130 rotates about a ring shape part 134a (strictly speaking, the pin member 114) disposed inside the notch 112a. Therefore, since the lower arm 134 rotates along the notch 112a, the movement of the arm 130 in the lateral direction is limited. In other words, the rotation of the arm 130 is limited the vertical direction (D2 direction). However, since the width of the notch 112a in the lateral direction is designed to be slightly larger than the width of the ring shape part 134a, some play may exist in the movement of the arm 130 in the lateral direction.

As described above, lure 100 of the present embodiment, the arm 130 is rotatably connected to the head 110 with the lateral direction of the head 110 as a rotation axis. With such a structure, even when the direction of the head 110 is changed by, for example, a change in water depth, or when the resistance received by the blade 140 is changed with a change in the retrieve speed, the arm 130 rotates following the change to correct the positional relationship between the head 110 and the blade 140 to an appropriate state in order to maintain the action of the lure 100 in an appropriate state. As a result, the lure 100 of the present embodiment can be stably used in a deep range regardless of the retrieve speed.

Further, in the present embodiment, the blade 140 swings without being rotated by receiving a water flow, functions as a resistor (lip) for advancing the lure 100 downward. The movable wire structure of the present embodiment is particularly effective in combination with such a blade 140. This point will be described below.

First, as a comparative example, it is assumed that the arm 130 is fixed to the head 110 in the lure 100 shown in FIG. 1A and FIG. 1B. In this case, as the retrieve speed increases, the attitude of the lure 100 changes and the action of the blade 140 fails at some point. Specifically, increasing the retrieve speed above a certain level may prevent the blade 140 from receiving the water flow in an appropriate condition and fail to function as a lip. In such a state, the action of the lure 100 may fail, fall sideways and rotate, or deviate from the normal trajectory.

In contrast, when the arm 130 is movably connected to the head 110 as in the present embodiment, when the retrieve speed increases, the positional relationship between the head 110 and the blade 140 is changed in accordance with the retrieve speed, and the head 110 and the blade 140 can always be kept in an appropriate positional relationship. By such an action, the lure 100 of the present embodiment can maintain a stable action regardless of the retrieve speed.

Further, when the lure 100 of the present embodiment is used in a deep range of water depth, even if the direction of the head 110 is changed, the positional relationship between the head 110 and the blade 140 is appropriately maintained following the change. As a result, the blade 140 functions normally as a lip, and the upward lifting of the lure 100 is suppressed. Thus, the lure 100 of the present embodiment can be stably used in a deep range.

As described above, in the lure 100 of the present embodiment, since it has a movable wire structure that does not fix the head 110 and the arm 130, it is possible to use stably in a deep range regardless of the retrieve speed. In particular, since the lure 100 of the present embodiment includes the blade 140 that swings without being rotated by receiving a water flow and functions as a lip for advancing the lure 100 downward, it is possible to realize a stable action in a deep range while suppressing the upward lifting of the lure 100.

(Modifications)

In the present embodiment, an example of applying to a wire bait of the type that the blade 140 swings without rotating has been shown, not limited to this example, it is also possible to apply to a spinner bait in which the blade rotates in a range of 360 degrees with respect to the arm. In this case, the blade is connected to the upper arm 132 via a swivel or the like.

Second Embodiment

In the present embodiment, an example in which the head and the arm are connected by a structure different from that of the first embodiment will be described. In the present embodiment, description will be given focusing on points different from the first embodiment, and description of the same components as those of the first embodiment will be omitted using the same reference numerals.

Figure 3A:
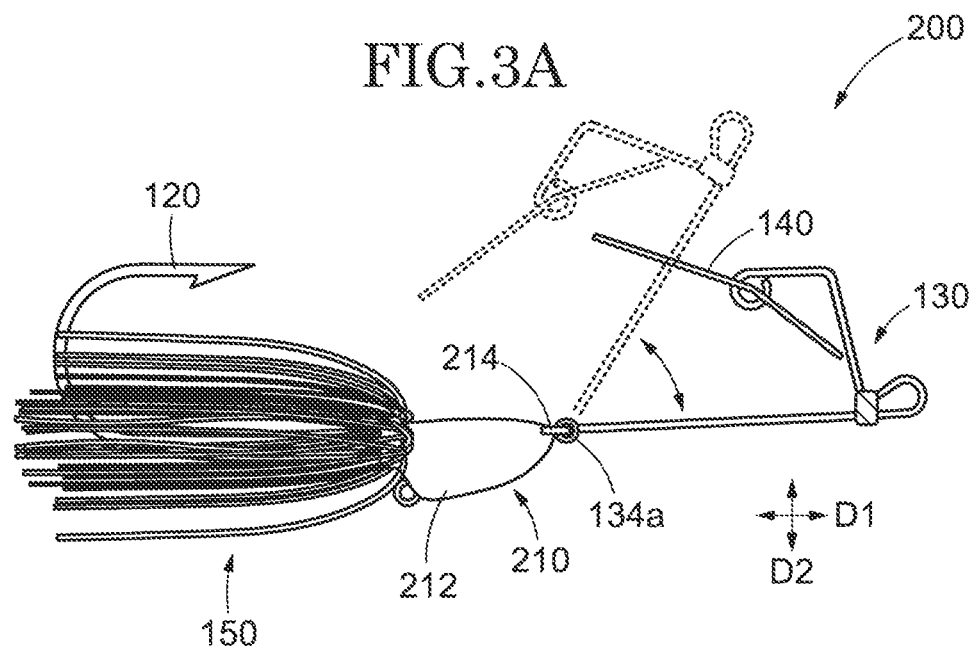
FIG. 3A is a diagram showing a configuration of a lure in a second embodiment.
Figure 3B:
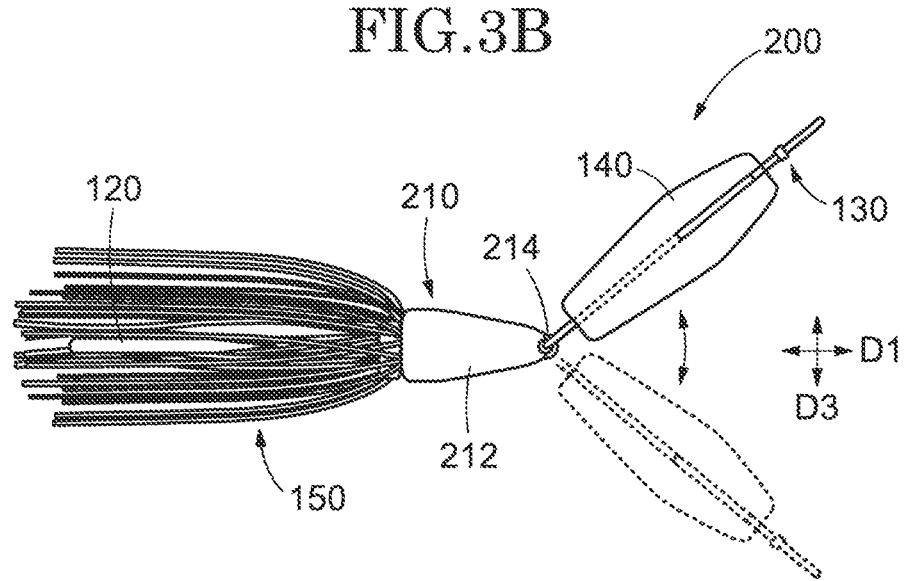
FIG. 3B is a diagram showing a configuration of the lure in the second embodiment.

FIG. 3A and FIG. 3B are diagrams showing a configuration of a lure 200 according to the second embodiment. Specifically, FIG. 3A shows a right side view of the lure 200, and FIG. 3B shows a top view of the lure 200. The lure 200 of the present embodiment uses the ring shape member 214 provided on the head body 212 of the head 210 when connecting the head 210 and the arm 130.

Ring shape member 214 is provided at the front edge of the head body 212 of the head 210. The center line passing through the center of the ring shape member 214 extends in the vertical direction (D2 direction). Therefore, the arm 130 of the present embodiment while being rotatable in the lateral direction of the head 210 (D3 direction) as a rotation axis, it is also possible to rotate the vertical direction of the head 210 (D2 direction) as a rotation axis. That is, the arm 130 of the present embodiment has a high degree of freedom of rotation as compared with the arm 130 of the first embodiment.

Also in this embodiment, since the arm 130 can be rotated in the lateral direction of the head 210 as a rotation axis, it achieves the same effect as the first embodiment.

Third Embodiment

In the present embodiment, an example in which a member for restricting the rotation of the arm is provided in the head or the arm will be described. In the present embodiment, description will be given focusing on points different from the first embodiment, and description of the same components as those of the first embodiment will be omitted using the same reference numerals.

Figure 4A:
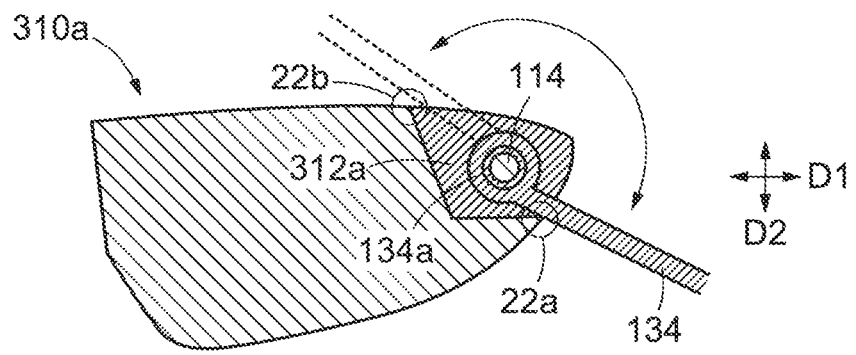
FIG. 4A is an enlarged view showing a configuration of a head of a lure in a third embodiment.
Figure 4B:
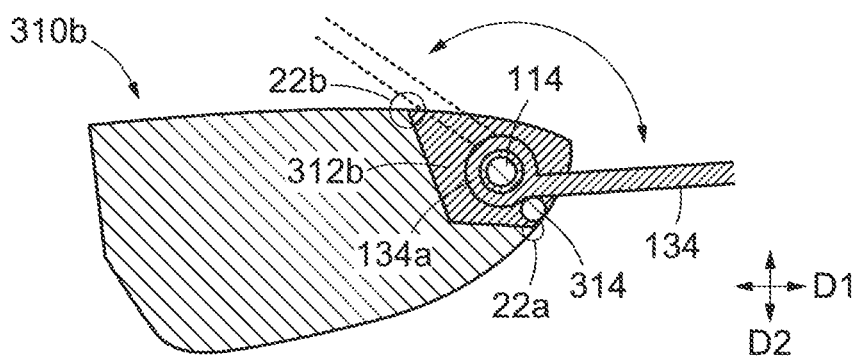
FIG. 4B is an enlarged view showing a configuration of the head of the lure in the third embodiment.
Figure 4C:
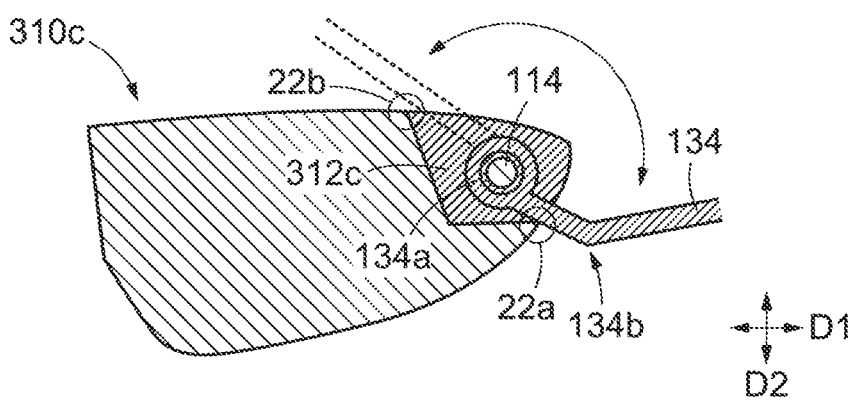
FIG. 4C is an enlarged view showing a configuration of the head of the lure in the third embodiment.

FIG. 4A to FIG. 4C are cross-sectional views showing the configuration of the heads 310a to 310c of the third embodiment. Specifically, FIG. 4A to FIG. 4C show side cross-sectional views of the heads 310a to 310c, respectively, taken along the center line in the longitudinal direction (direction D1).

The construction shown in the FIG. 4A is an embodiment in which the head 310a is provided with a member for restricting the rotation of the arm 130. In FIG. 4A, the area indicated by the hatched line is the inner wall surface of the notch 312a corresponding to the notch 112a shown in the FIG. 1C. In the configuration shown in the FIG. 4A, when the arm 130 rotates downward, the lower arm 134 contacts with the lower edge 22a of the notch 312a to restrict the rotation. Conversely, when the arm 130 rotates upward, the lower arm 134 contacts with the edge 22b on the upper side of the notch 312a to restrict the rotation.

In this manner, the rotation of the arm 130 can be restricted by the shape of the notch 312a provided in the head 310a. In this case, by controlling the positions of the lower edge 22a and the upper edge 22b of the notch 312a, it is possible to restrict the rotation of the arm 130 to a predetermined angular range.

In the configuration shown in the FIG. 4B, similarly to FIG. 4A, the head 310a is provided with a member for restricting the rotation of the arm 130, but the rotation limiting member 314 is provided inside the notch 312b. Rotation limiting member 314 is disposed above the lower edge 22a of the notch 312b. Therefore, the lower arm 134 is restricted downward rotation by contacting with the rotation limiting member 314.

In the construction shown in the FIG. 4B, it is preferable to use a metallic material such as tungsten or bismuth, which is harder than lead, as the rotation limiting member 314. Because lead comes under the category of the soft material among the metal, when limiting the rotation of the lower arm 134 by utilizing the edge 22a of the notch 312b, the position of the edge 22a may be changed over the course of use, there is a possibility that the rotation range is changed. In contrast, for the structure shown in FIG. 4B, as the rotation limiting member 314, by using a harder metallic material than the material of the head 310b, it is possible to limit the rotation of the lower arm 134 without changing the rotation range of the lower arm 134.

Structure shown in FIG. 4C is an example that a member for limiting the rotation of the arm 130 is provided in the arm 130. Specifically, the bend part 134b is provided in the vicinity of the edge of the lower arm 134, and the portion between the ring shape part 134a and the bend part 134b of the lower arm 134 is used as a member for restricting the rotation. In this case, when the portion between the ring shape part 134a and the bend part 134b contact with the lower edge 22a of the notch 312c, the portion of the arm 130 that is forward of the bend part 134b (such as the upper arm 132 and the line eye 136) is not lowered more than necessary, and as a result, the rotation of the arm 130 can be limited.

As described above, the lure of the present embodiment has means for restricting the rotation of the arm 130 in the head (the head 310a or 310b) or the arm 130 (specifically, the lower arm 134). Thus, by the arm 130 during casting (when throwing the lure) so as not to rotate more than necessary, it is possible to extend the flying distance by reducing the air resistance in the air.

The structure of the means for restricting the rotation of the arm 130 described in the present embodiment is not limited to the structures shown in FIG. 4A to FIG. 4C. As long as the rotation of the arm 130 can be limited to a predetermined angular range, it can be applied to any structure.

Fourth Embodiment

In the present embodiment, an example will be described in which a member for preventing the arm from being caught by roots. In the present embodiment, description will be given focusing on points different from the first embodiment, and description of the same components as those of the first embodiment will be omitted using the same reference numerals.

Figure 5A:
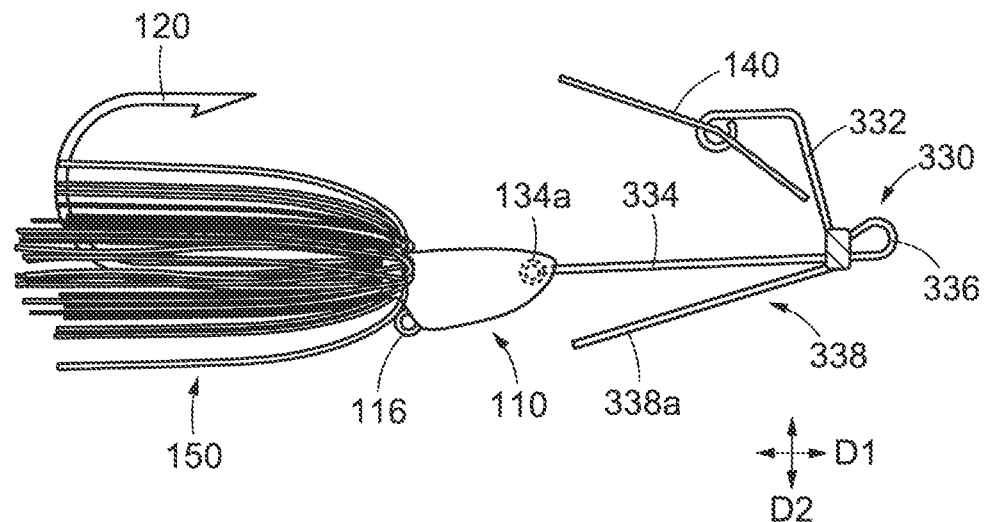
FIG. 5A is a diagram showing a configuration of a lure in a fourth embodiment.
Figure 5B:
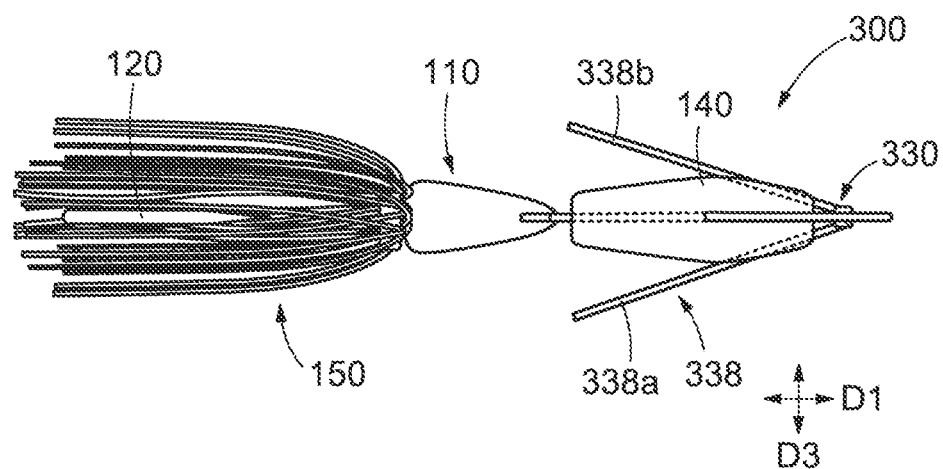
FIG. 5B is a diagram showing a configuration of the lure in the fourth embodiment.

FIG. 5A and FIG. 5B are diagrams showing a configuration of a lure 300 according to the fourth embodiment. Specifically, FIG. 5A shows a right side view of the lure 300, and FIG. 5B shows a top view of the lure 300. As shown in the FIG. 5A, the lure 300 of the present embodiment has a guard member 338 for preventing the arm 330 from getting snagged. Specifically, the guard member 338 is provided on the lower arm 334 of the arm 330.

In the present embodiment, the guard member 338 is composed of two guard lines 338a and 338b composed of wires (metal wires). Specifically, as shown in FIG. 5A, one end of the guard lines 338a and 338b is fixed in the vicinity of the line eye 336, the other end is configured to be positioned obliquely downward. At this time, as shown in the FIG. 5B, in the top view, the two guard lines 338a and 338b extend obliquely from the vicinity of the line eye 336 to form a substantially V-shape.

As described above, by placing the guard member 338 from the line eye 336 to the vicinity of the head 110, when the lure 300 is used in a deep range, it is easy to avoid from getting snagged with obstacles (sinking ship, trees, artificial structures, etc.) existing near the lake bottom or riverbed. In addition, the lure 300 of the present embodiment has an advantage of high slip-through performance with respect to aquatic plants such as weeds because the upper arm 332 extends obliquely upward from the line eye 336 as a starting point and the guard lines 338a and 338b extend obliquely downward.

Fifth Embodiment

In the present embodiment, an example in which the head and the arm are connected by a structure different from that of the first and second embodiments will be described. In the present embodiment, description will be given focusing on points different from the first and second embodiments, and description of the same components as those of the first and second embodiments will be omitted using the same reference numerals.

Figure 6A:
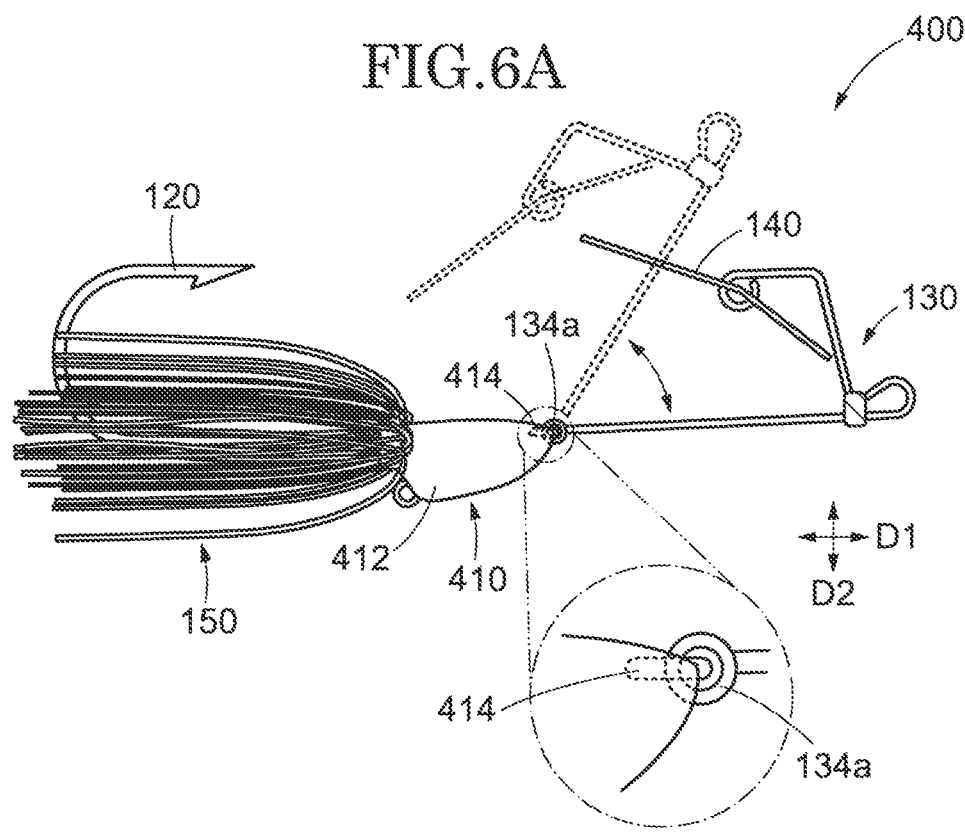
FIG. 6A is a diagram showing a configuration of a lure in a fifth embodiment.
Figure 6B:
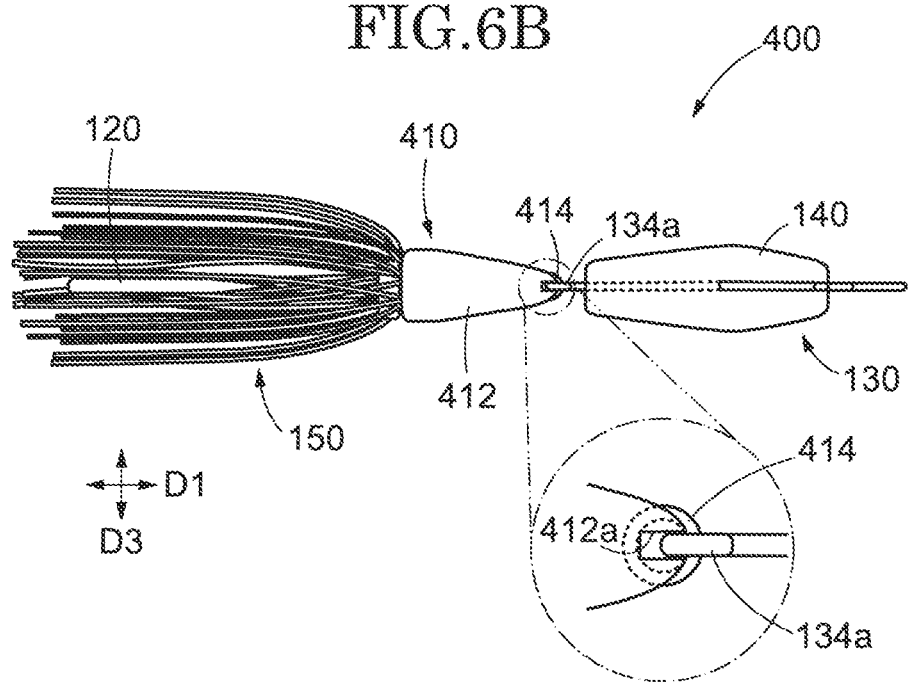
FIG. 6B is a diagram showing a configuration of the lure in the fifth embodiment.

FIG. 6A and FIG. 6B are diagrams showing a configuration of a lure 400 according to the fifth embodiment. Specifically, FIG. 6A shows a right side view of the lure 400, and FIG. 6B shows a top view of the lure 400. As same as the second embodiment, the lure 400 of the present embodiment uses a ring shape member 414 provided on a head body 412 of a head 410 when connecting the head 410 and the arm 130. A center line passing through a center of the ring shape member 414 extends in the vertical direction (D2 direction). In this embodiment, a notch 412a is provided at the forward end of the head body 412. The ring shape member 414 is embedded in the front end of the head body 412 so that it overlaps the notch 412*a*.

When the ring shape part 134*a* of the arm 130 and the ring shape member 414 in the head body 412 are connected, the ring shape part 134*a* fits inside the notch 412*a*, as shown in FIG. 6A and FIG. 6B. In other words, in the side view, the ring shape part 134*a* overlaps with the head body 412. Therefore, the direction of rotation of the arm 130 is limited to rotation with the lateral direction D3 of the head 410 as the rotation axis. That is, the direction of rotation of the arm 130 is limited to a vertical rotation. The notch 412*a* may be omitted in this embodiment. In other words, by embedding the ring shape member 414 in the forward end of the head body 412, the ring shape part 134*a* of the arm 130 and the head body 412 should be overlapped in the side view. By using such a structure, the direction of rotation of the arm 130 can be restricted to the lateral direction D3 of the head 410.

Also in this embodiment, since the arm 130 can be rotated in the lateral direction of the head 410 as a rotation axis, it achieves the same effect as the first embodiment.

Sixth Embodiment

In the first embodiment to the fifth embodiment, a wire bait is described as an example as a lure to which the present invention is applied, but the present invention is not limited thereto, and the present invention is applicable to other types of lures.

For example, the present invention can be applied to a sinking type lure that can be used in a deep range, such as a metal vibration, a metal jig, a rubber jig, a jig head rig, or the like. When a portion of the metal jig is rotatably connected to one end of the arm 130 and the blade 140 described in the first embodiment is connected to the other end, the metal jig can be stably used in a deep range.

Further, the present invention is not limited to a lure for freshwater fish, and may be applied to a lure for seawater fish. When the present invention is applied to the above-mentioned metal jig, it is particularly suitable as a lure for seawater fish.

While the present invention has been described with reference to the accompanying drawings, the present invention is not limited to the above embodiments, and can be appropriately modified without departing from the spirit of the present invention. The above-described embodiments can be combined with each other as long as there is no particular technical contradiction.

What is claimed is:

1. A fishing lure comprising:
a head;
a hook connected to the head;
an arm rotatably connected to the head with a lateral direction of the head as a rotation axis, the rotation axis located inside the head; and
a blade connected to the arm,
wherein
the arm comprises a limited range of rotation around the rotation axis,
the arm comprises an upper arm having a rear end connected with the blade and a lower arm connected to the head,
the blade has two through holes for connecting the upper arm and the blade,
the rear end of the upper arm includes a first bent portion and a second bent portion inserted into the two through holes of the blade, respectively, and
when the fishing lure is in use in the water, a distance from a center point between the two through holes to a top of the blade is longer than a distance from the center point to a bottom of the blade,
the head comprises a head body and a notch provided in front of the head body, and
the rotation axis is positioned so as to cross the notch and included in a pin member arranged inside the notch.

2. The fishing lure according to claim 1, wherein
the arm is connected to the head in a non-detachable manner.

3. The fishing lure according to claim 1, wherein
the upper arm further has a bend part, and
a portion of the upper arm located between the bend part and the blade extends rearwardly.

4. The fishing lure according to claim 1, wherein
a rotation locus formed when the arm is rotated is included in a plane with the lateral direction of the head as a perpendicular line.

5. The fishing lure according to claim 1, wherein
the arm is restricted from moving in the lateral direction of the head.

6. The fishing lure according to claim 1, wherein
a ring shape member located at a rear end of the head body.

7. A fishing lure comprising:
a head;
a hook connected to the head;
an arm rotatably connected to the head with a lateral direction of the head as a rotation axis, the rotation axis located inside the head; and
a blade connected to the arm,
wherein
the arm comprises a limited range of rotation around the rotation axis,
the arm comprises an upper arm having a rear end connected with the blade and a lower arm connected to the head,
the blade has two through holes for connecting the upper arm and the blade,
the rear end of the upper arm includes a first bent portion and a second bent portion inserted into the two through holes of the blade, respectively,
when the fishing lure is in use in the water, a distance from a center point between the two through holes to a top of the blade is longer than a distance from the center point to a bottom of the blade, and
the blade is bent so as to form a bend line extending widthwise through the center point.

8. The fishing lure according to claim 7, wherein
the lower arm is provided with a guard member extending backward and downward.

9. The fishing lure according to claim 7, wherein
the head comprises a head body and a ring shape member embedded in front of the head body,
a center line passing through a center of the ring shape member extends in a vertical direction, and
the arm is connected to the head via the ring shape member and is overlapped with the head body in side view.

10. A fishing lure comprising:
a head;
a hook connected to the head;

an arm rotatably connected to the head with a lateral direction of the head as a rotation axis, the rotation axis located inside the head; and a blade connected to the arm, wherein the arm comprises a limited range of rotation around the rotation axis, the arm comprises an upper arm having a rear end connected with the blade and a lower arm connected to the head, the blade has two through holes for connecting the upper arm and the blade, the rear end of the upper arm includes a first bent portion and a second bent portion inserted into the two through holes of the blade, respectively, when the fishing lure is in use in the water, a distance from a center point between the two through holes to a top of the blade is longer than a distance from the center point to a bottom of the blade, the head comprises a protective member made of a material harder than the head at a tip, and the rotation axis is positioned so as to cross the protective member.

\* \* \* \* \*